Dec. 15, 1970  D. B. GIACALONE ET AL  3,548,286
GAS SENSOR FOR BATTERY CHARGER
Filed March 7, 1969  2 Sheets-Sheet 1
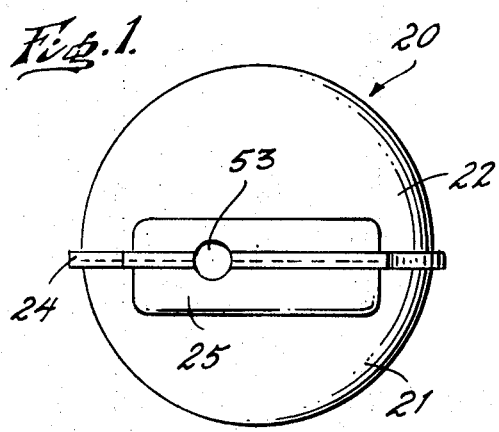
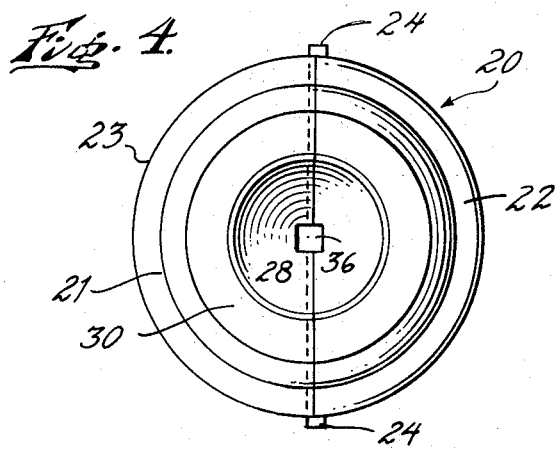
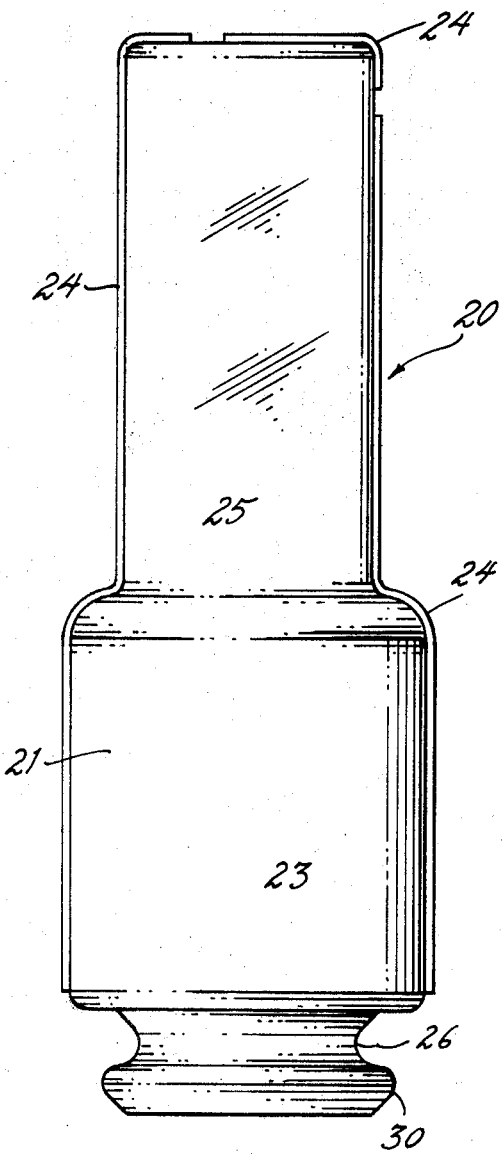
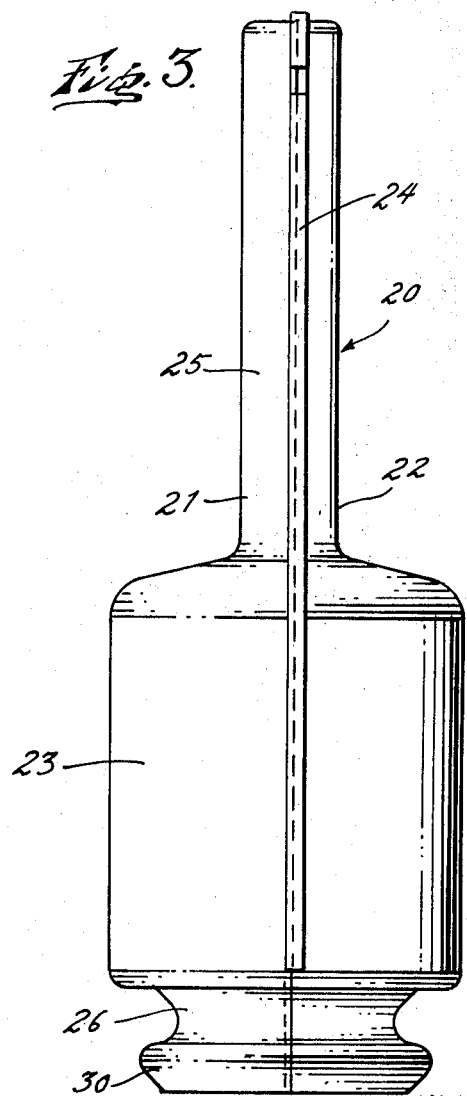
INVENTORS
DINO B. GIACALONE
EDGAR M. SMITH
BY
Jackson, Jackson, & Chovanes
ATTORNEYS

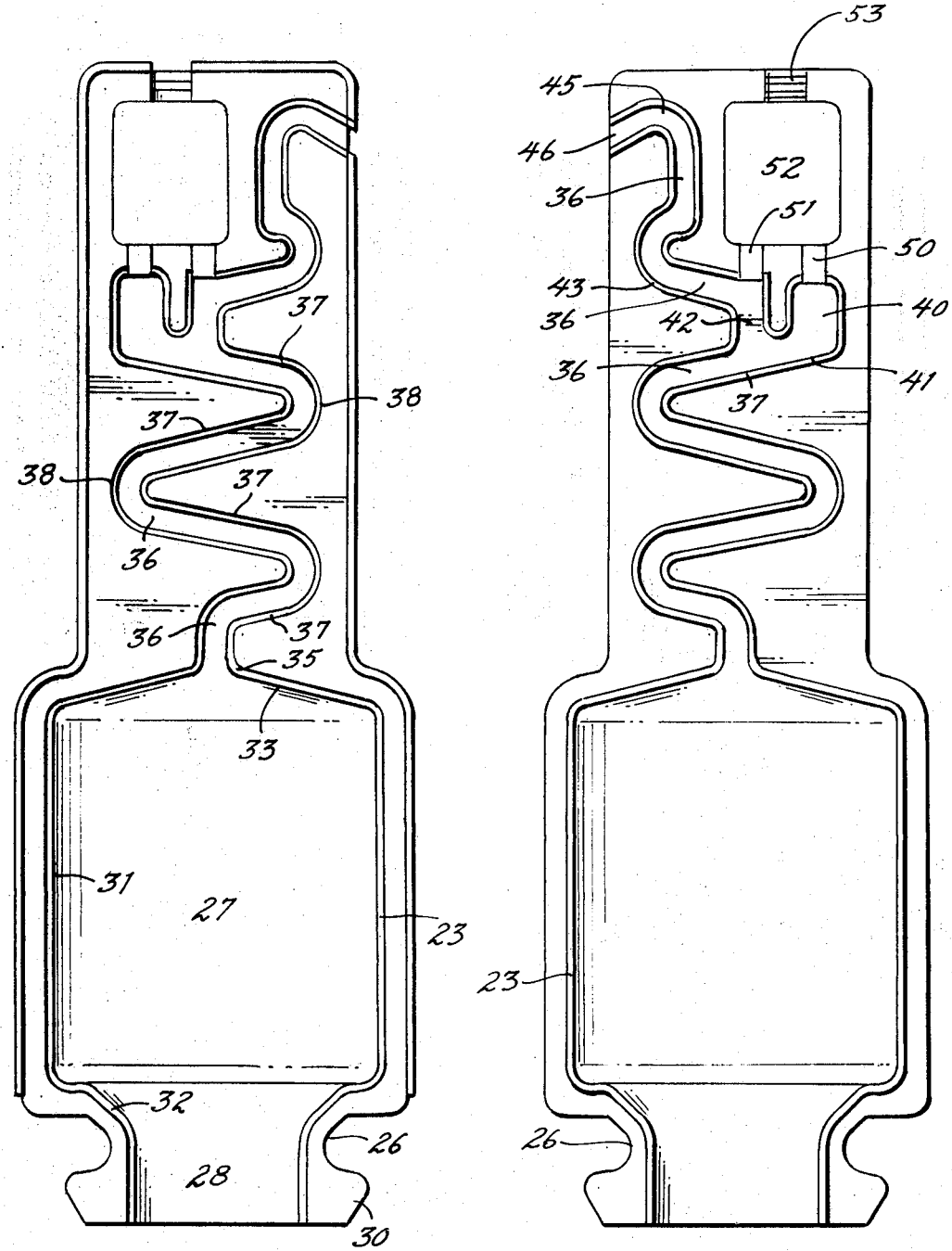

United States Patent Office 3,548,286
Patented Dec. 15, 1970

3,548,286
GAS SENSOR FOR BATTERY CHARGER
Dino B. Giacalone, Valley Forge, Pa., and Edgar M. Smith, Hopewell, N.J., assignors to John R. Hollingsworth Company, Phoenixville, Pa., a corporation of Pennsylvania
Filed Mar. 7, 1969, Ser. No. 805,265
Int. Cl. H01m 1/06
U.S. Cl. 320—35    1 Claim

ABSTRACT OF THE DISCLOSURE

A device for connection to a storage battery cell during charging of the battery, wherein gas evolved during the charging, and particularly as the battery is increasingly charged, is sensed to provide means for controlling the charge to the battery from the battery charger.

BACKGROUND OF THE INVENTION

Field of the invention

The invention relates generally to battery chargers used to recharge storage batteries after use, and more particularly to the control for such battery chargers.

It is necessary in the use of electrical storage batteries, and particularly those of a heavy duty type such as are used to operate fork lift trucks and the like, to periodically recharge the batteries with an electrical charge. One of the means of controlling the rate of charge to the battery involves sensing the gas which is emitted during charging. It is known that as the battery becomes increasingly charged, incoming charge not used for charging the plates of the battery is dissipated by breaking down the electrolyte into its gaseous components. In United States Pat. No. 3,123,758, issued Mar. 3, 1964 to D. B. Giacalone a sensor device is disclosed for sensing such emitted gas from the battery to in turn control a battery charger.

The present invention is concerned with an improved structure for providing such gas sensing.

Description of the prior art

The type of battery charger control involved in the present invention is shown in Giacalone U.S. Pat. 3,123,-758, issued Mar. 3, 1964, for Storage Battery Charging.

Control of a battery charger is achieved by a gas sensor which senses the rate of discharge of evolved gas from the battery.

During the charge of a storage battery, an electrical current is passed through the battery plates and converted into chemical energy. This charging current must flow at a certain rate which depends mainly on the state of charge of the battery. When the battery is in a discharged condition, comparatively high charging rates can be used and practically all of the current is converted into chemical energy; as the charging progresses, the more accessible portions of the active material in the plates become fully charged, the uncharged active material is not only reduced but confined to less accessible areas of the plates, where acid diffusion is reduced. Thus the rate at which the remaining uncharged material can be charged is reduced. At this point, any charging current in excess of that which can be readily absorbed will dissociate water in the electrolyte into its component elements, oxygen and hydrogen, giving origin to the phenomenon known as gassing.

Initially, if the charge being put in the battery is, for instance, 10 amperes, the plates may, for instance, be able to receive the entire 10 amperes. However, as the plates become increasingly charged they may only be able to receive 5 amperes and the remaining 5 amperes of the incoming charge ends up in being dissipated by breaking down the electrolyte into its gaseous components. Hence, as the battery becomes saturated or more fully charged, more energy from the incoming charge is dissipated in the electrolyte, and more gas is emitted, unless the charging current is properly controlled. Excessive gassing will in turn produce excessive heat which shortens the life of the battery.

In the device to which the present invention relates, a sensor having a "sensing" element extends in the flow path of the evolved gases, and a "reference" element extends in a relatively stagnant pool of the same gases to provide a datum base for comparison.

To increase the sensitivity of the comparison, the sensor elements are heated to an elevated temperature. Thus, when the battery approaches the fully charged state, the flow of gases over the "sensing" element will cool that element relative to the "reference"; this cooling effect increases with an increase in gas flow.

The above concept has been covered in issued U.S. Pat. 3,123,758.

SUMMARY OF THE INVENTION

The present structure provides an optimum arrangement for sensing the gases as discussed above. First, an expansion chamber has been provided in the area immediately adjacent the battery wherein any overflow liquid electrolyte caused by the gas generation, is contained, and the gas evolved is permitted, and directed, into the flow channel for sensing as described above.

Secondly, there is provided an optimum arranged flow path wherein any condensate generated in the sensor drains back into the battery without accumulating in the sensor.

Thirdly, in the present invention, the stagnant pool space is so constructed whereby any condensate in the pool is drained back into the battery and not trapped in the pool space.

BRIEF DESCRIPTION OF THE DRAWINGS

FIG. 1 is a top plan view of the assembled device of the invention.

FIG. 2 is a front elevation of the device of FIG. 1.

FIG. 3 is a side elevation of the device of FIGS. 1 and 2.

FIG. 4 is a bottom plan section of the device of FIGS. 1 to 3.

FIG. 5 is a right side elevation of the left half of the device shown in FIGS. 1 to 4.

FIG. 6 is a left side elevation of the right half of the device shown in FIGS. 1 to 4.

DESCRIPTION OF THE PREFERRED EMBODIMENT

Gas sensor 20 is composed of halves 21 and 22, and has at the lower part thereof a hollow cylindrical portion 23. A flat rectangular portion 25 extends integrally upward from portion 23, and a lower neck 26 extends downwardly from portion 23. The halves 21 and 22 are held together by a suitable flange 24 which is integral with one of the halves, and which has thereon lugs which snap into matching indents on the other half, in the well known manner. The halves may be of any composition suitably inert to battery electrolyte and gases, and adaptable to molding.

Hollow cylindrical portion 23 has therein a chamber 27 as seen in FIGS. 5 and 6, which has connected thereto cylindrical flow path 28 extending through the interior of neck portion 26. Neck 26 has a circumferentially extending shoulder 30 which is connected to the cell opening of a storage battery through a suitable gas tight connection as, for instance, shown in our co-pending United States patent application Serial No. 805,220 filed March 7, 1969, for Battery Cap Adaptor. Chamber 27 has cylindrical side walls 31 and a sloping floor 32, with a dome shaped ceiling 33. At the apex of dome 33 at 35, a generally serpentine contoured flow path 36 extends upwardly through flat portion 25 of sensor 20.

Flow path 36 is of a special configuration and has downwardly sloping portions 37 connected by arcuate end connections 38. Flow path 36 has at its upper end a stagnant pool cavity 40 which is generally rectangular in cross-section and has at its bottom a sloping floor 41 which extends in continuation of sloping portion 37 of flow path 36. Flow path 36 continues vertically upward at 42 and then continues into a sloping portion at 43 which curves upwardly to a point at 45. The flow path 36 then turns downwardly and exhausts to the atmosphere at 46.

Sensor elements 50 and 51 extend into the stagnant pool 40 and flow path 36 respectively at the positions shown. Sensor elements 50 and 51 extend from terminals contained in housing 52 which receives electrical leads through opening 53. The electrical characteristics of sensor elements 50 and 51 are not shown as they are of a conventional thermistor type, capable of sensing the temperature of the ambient in which they are exposed. In the operation of the device 20, the elements 50 and 51 are heated to a base temperature, and it is the relative difference in cooling effect between the gas in the stagnant pool and the gas in the flow path which is measured. The electrical operation of the sensor elements follow that discussed in U.S. Pat. 3,123,758, referred to above.

In the operation of our device, sensor 20 is connected by a suitable gas tight seal at its neck 26 and particularly at shoulder 30 to the cell opening of a battery undergoing an electrical charge. Evolved gases during charging pass through flow path 28, into chamber 27, and through flow path 36 to discharge at 46. A portion of the evolved gases are trapped and remain in stagnant pool cavity 40 while the remaining gases continuously evolved from the battery pass through flow path 36 and exit to the atmosphere at 46. Sensor element 50, the reference sensor element, has a certain electrical resistance which is a function of its bias and of the temperature of the stagnant gases at pool 40; sensor element 51, the sensing element, has approximately the same resistance, with no gas flow, as sensor element 50.

As the flow of gas begins past sensing sensor element 51, this element is cooled; this change in temperature produces a change in its resistance, which, when compared to the resistance of the reference sensor element 50 in the stagnant pool, establishes an electrical signal which is proportional to the flow rate of gases; this signal in turn is used to control the rate of charge to the battery as discussed above.

In the present invention, in the event that the generated gases within an unintentionally overfilled cell force the electrolyte out of the cell through the cell opening, the electrolyte passes into chamber 27 through conduit 28, and is harmlessly held in chamber 27 without impairing the function of the sensor in any way. Evolved gases continue to pass upwardly from the cell through the electrolyte temporarily held in the expansion chamber 27 up through flow path 36. When the charge is completed and very little current flows into the battery, the electrolyte within chamber 27 is then free to flow out of chamber 27 and back into the battery cell.

As the evolved gases from the battery flow through flow path 36, they carry with them some vaporized electrolyte. As the gas passes through flow path 36 there is a tendency for the electrolyte vaporized in the gas to condense. When this happens the condensate flows downwardly along flow path 36 at sloping portions 37 and through arcuate portions 38, eventually dripping back into the battery through chamber 27 and conduit 28. The serpentine sloping contour of flow path 36 is such that no condensate is trapped in the flow path to interfere with upward gas flow.

If traces of water vapor should reach the stagnant pool 40 and condense on its walls, the condensate will drain to the bottom sloping floor 41 of cavity 40 and will be returned from cavity 40, under the influence of gravity, into flow path 36. The condensate is returned from cavity 40 under the influence of gravity into flow path 36 where it is channelled back into the battery cell.

By means of the structure of the present invention, there is no interference to proper operation of the device from the electrolyte within the battery either in the event of an expansion of the electrolyte out of the battery, due to an overfilled cell, or under normal conditions wherein condensate forms on the gas sensor walls while the gases are travelling through the sensor. In the structure described above, sensor elements 50 and 51 are free from effects of condensate to properly perform their intended function of measuring gas flow.

Having thus described our invention, what we claim as new and desire to secure by Letters Patent is:

1. A gas sensor for application to a battery cell opening of a storage battery to control the rate of charge of the battery, having sensor elements therein for sensing the flow rate of gas from the electrolyte of the battery during charging, comprising:
   (a) a housing;
   (b) an internal channel through the housing having
      (a) an expansion chamber at its lower end adapted to receive an overflow of electrolyte from the battery,
      (b) a serpentine contoured flow passage extending upwardly from the chamber and exhausting to the atmosphere, and
      (c) a stagnant pool cavity connected to the flow passage for receiving a quantity of gas;

wherein said serpentine flow passage and cavity have continuously downwardly sloping bottoms whereby condensate created within the serpentine flow passage and stagnant pool cavity flows downwardly into the expansion chamber and into the cell opening.

References Cited
UNITED STATES PATENTS

| | | | |
|---|---|---|---|
| 1,034,108 | 7/1912 | Halbleib | 320—46 |
| 1,045,291 | 11/1912 | Holland | 136—82(.8) |
| 1,187,148 | 6/1916 | Hutchison | 320—46X |
| 1,758,522 | 5/1930 | Viershaw | 320—36 |
| 2,204,101 | 6/1940 | Fumagalli | 320—46X |
| 2,701,332 | 2/1955 | Andre | 320—46 |
| 3,123,758 | 3/1964 | Giacalone | 320—36 |
| 3,460,019 | 8/1969 | Mas | 320—46X |

WILLIAM M. SHOOP, Jr., Primary Examiner

U.S. Cl. X.R.

136—182; 320—46